United States Patent
Guilmette

(10) Patent No.: US 6,724,488 B1
(45) Date of Patent: Apr. 20, 2004

(54) INTERFEROMETER FOR LENGTH MEASUREMENT

(76) Inventor: Paul L. Guilmette, P.O. Box 13, Canton Center, CT (US) 06020

( * ) Notice: Subject to any disclaimer, the term of this patent is extended or adjusted under 35 U.S.C. 154(b) by 145 days.

(21) Appl. No.: 10/141,512

(22) Filed: May 7, 2002

(51) Int. Cl.[7] .................................................. G01B 9/02
(52) U.S. Cl. .................................................... 356/498
(58) Field of Search ................................ 356/496, 498, 356/500, 486, 487, 493

(56) References Cited

U.S. PATENT DOCUMENTS

| | | | | |
|---|---|---|---|---|
| 3,582,211 A | * | 6/1971 | McClure et al. | 356/500 |
| 4,153,370 A | * | 5/1979 | Corey, III | 356/498 |
| 4,509,858 A | | 4/1985 | Smythe et al. | 356/358 |
| 4,583,856 A | | 4/1986 | Moore | 356/358 |
| 4,924,477 A | | 5/1990 | Gilmore et al. | 374/55 |
| 4,950,079 A | * | 8/1990 | McMurtry et al. | 356/498 |
| 5,428,446 A | * | 6/1995 | Ziegert et al. | 356/498 |

OTHER PUBLICATIONS

Renishaw® Product Data Sheet for HS10 Laser Head, Part No. L-8003-2415, 2 pages.
R. Smythe et al, "Instantaneous phase measuring interferometry", *Optical Engineering*, Jul./Aug. 1984, vol. 23, No. 4, pp. 361-364.
ACC, Korea Aerospace Industry, Ltd., Carbon/Carbon Composite, Internet website http://www.koreaaero.com/acc/product_c_c_composite.htm, dated Feb. 3, 2002, pp. 1 and 2.
Clinton Chapman, 1995, Material World, An overview of Carbon/Carbon Composites, Internet website http://home.freeuk.com/dseymour/mw/mwccc.htm, dated Jan. 27, 2002, pp. 1 and 2. Chapter 40, 40-8, Michelson's Interferometer, p. 913.
*Industrial Application of Lasers*, Chapter 9, "Principles Used in Measurement", pp. 247-250, and Chapter 10, "Distance Measurement and Dimensional Control", pp. 256-263.
C.W. Ohlhorst et al, NASA Technical Memorandum 4787, "Thermal Conductivity Database of Various Structural Carbon-Carbon Composite Materials", Nov. 1997, cover page and pp. lil, v and 1-3.

* cited by examiner

*Primary Examiner*—Samuel A. Turner

(57) ABSTRACT

A measurement interferometer (40) having a frame structure (43), a laser source (12), a detector (14), a beam splitter (18), a reference retroreflector (28), a reference holder (20) and a test retroreflector (30). The reference rertoreflector (28) and beam splitter (18) are disposed in fixed relation to the reference holder (20) to constitute a splitter-holder assembly (16). The test retroreflector (30) and the splitter-holder assembly (16) are movable relative to each other and both are movably mounted on the fine structure (43). Preferably, the test retroreflector (30) is situated between the reference holder (20) and the beam splitter (18). In a particular embodiment the beam splitter (18) is connected to the reference holder (20) by a carbon composite rod (22), and the test retroreflector (30) is mounted on a probe (34) made from a carbon composite. In one embodiment, the reference retroreflector (28) is integral with the beam splitter (18). There may be a vibration-dampening member such as a spring (62) between the splitter-holder assembly (16) and the frame structure (43).

8 Claims, 3 Drawing Sheets

INTERFEROMETER FOR LENGTH MEASUREMENT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to optical measurement devices and particular, to interferometers.

2. Related Arts

U.S. Pat. No. 4,509,858 to Smythe et al, dated Apr. 9, 1985 and entitled "Compact, Linear Measurement Interferometer With Zero Abbe Error", comprises a light source 11, a detector 12 and a beam splitter 13. The beam splitter divides a beam of light from the source into a test beam and a reference beam. There is a retroreflector in the path of the reference beam and a separate retroreflector in the path of the test beam. The second retroreflector is mounted on a probe 15 which passes through the beam splitter and which can rest on a work piece 17 that is mounted on a table 16. The source 11, detector 12, beam splitter 13 and retroreflector 14 are all mounted on a base that is sturdily positioned over measuring table 16 (see column 3, lines 22–24). The mounting table 16 is usually made of granite or ceramic or the like so that the force of the measurement probe does not deflect the workpiece and the reference holder down-wardly when the measurement probe makes contact with the workpiece Any such downward deflection will cause a significant measurement error. The Smyfte et al Patent also requires a central aperture 20 in the beam splitter 13 through which probe 15 can move (see column 2, line 66 to column 3, line 7).

U.S. Pat.4,924,477 to Gilmore et al, dated May 8, 1990 and entitled "Assembly And Method For Determining the Coefficient Of Thermal Expansion Of A Workpiece", discloses an apparatus for measuring the coefficient of thermal expansion (CTE) of a workpiece of known length (see column 5, line 50 through column 6, line 36). Th apparatus requires a dual channel light Source and reflectors situated at both ends of the workpiece. The two light signals are directed towards the first reflector, which reflects one signal but passes the other to the second reflector, from which it is reflected. A temperature control system is used to vary the temperature of the workpiece to cause thermal expansion and the CTE is determined by changes in measured light frequencies caused by relative doppler frequency shifts of the reflectors as the workpiece changes in length (see column 6, lines 1–36). As described at column 4, lines 31–36, the assembly has a flexure system so that a workpiece undergoing expansions and contractions during testing can flex causing the image devices (36 and 38 in FIG. 3) to move. This assembly is used to measure the expansion and contraction of a workpiece with a flexure system, so that the coefficient of expansion of the workpiece can be determined. The flexure system only allows for a small amount of movement and is not suitable for measurement of relatively long workpieces. This assembly additionally has laser beam around the sides of the workpiece with imaging devices on both sides of the workpiece. This arrangement leads to a small amount of Abbe error since the measurement path is not directly in line with the gauging points.

SUMMARY OF THE INVENTION

The present invention provides a measurement interferometer comprising a frame structure on which is mounted a laser source that emits a source beam, a detector, a beam splitter, a reference retroreflector, a test retroreflector and a reference holder. The invention is characterized in that the beam splitter and the reference holder are interconnected in fixed mutual relation by a connector to constitute a splitter-holder assembly, the beam splitter is positioned to receive a light beam from the laser source and emit a test bean and a reference beam split from the source beam, the reference retroreflector is positioned at a fixed distance from the beam splitter to receive the reference beam from the beam splitter, and in that the test retroreflector is positioned to receive the test beam from the beam splitter and is movable on the frame structure relative to the splitter-holder assembly.

According to another aspect of the invention, the beam splitter is connected to the reference holder by a composite rod. Optionally, the test retroreflector may carry a probe comprising a carbon composite rod as well.

According to yet another aspect of the invention, the reference retroreflector may be in with the beam splitter.

Still another aspect of this invention provides that there may be vibration-dampering member between the splitter-holder assembly and the frame structure.

DETAILED DESCRIPTION OF THE INVENTION AND PREFERRED EMBODIMENTS THEREOF

In an interferometer in accordance with a first aspect of this invention, a beam splitter is disposed in fixed relation to a reference bolder on which the object being measured is placed. By virtue of the fixed relationship between the beam splitter and the reference holder they are sometimes referred to collectively herein as the "splitter-holder assembly". A test retroreflector is movably disposed between the beam splitter and the reference holder so that it can rest, relative to the reference holder, at a position determined by the dimension of a workpiece on the reference holder.

Broadly described, one embodiment of an interferometer according to the fit assembly of this invention comprises a source of light, e.g., a laser beam. There is a beam splitter for splitting the light source beam into a reference beam and a test beam. The reference beam is directed towards a reference retroreflector that returns the reference beam and directs it towards a detector. The reference retroreflector is at a fixed distance from the beam splitter, e.g., the reference retroreflector is integral with the beam splitter, e.g., it may be bonded thereto. The test beam is directed from the beam splitter towards a test retroreflector that is a movable relative to the reference holder between a reference position and a measured position determined by the measured dimension of the workpiece. The test retroreflector returns the test beam for combination with the reference beam to comprise a combination beam. As is well-known in the art, movement of the test retroreflector from the reference position to the measurement position causes fluctuations (or "fringes") in the intensity of the combination beam due to changes in the relative phase relationship between the reference beam and the test beam, and the detector senses the fringes. Processing circuitry (known in the art) associated with the detector cam determine the magnitude of movement of the test retroreflector and thus determine the measured dimension of the workpiece, e. g., by counting the fringes generated by moving the test retroreflector from the reference position to the test position.

Figure 1:
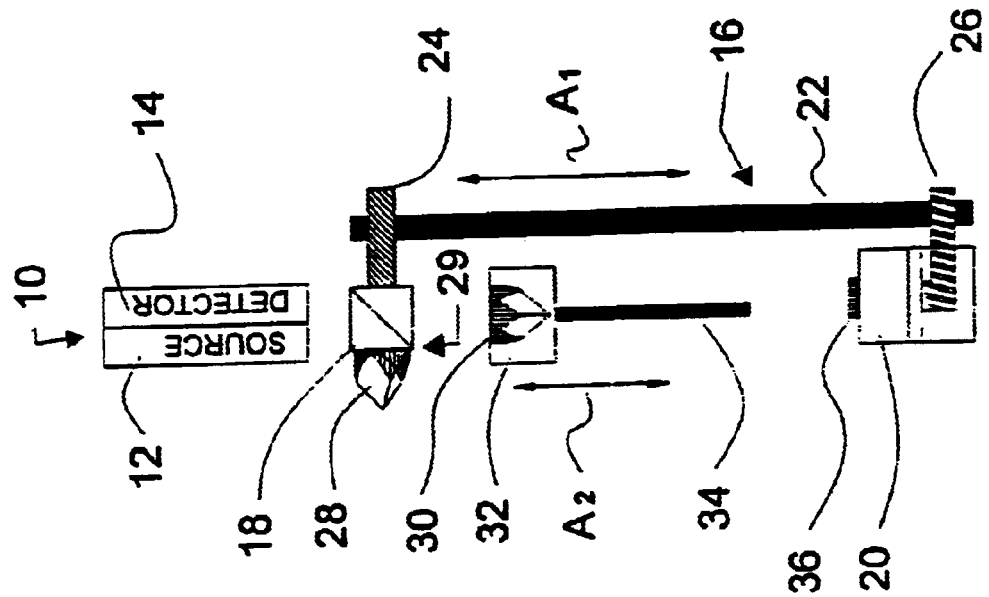
FIG. 1 is a schematic elevational view of the elements of an interferometer in accordance with the present invention.

The basic components of an interferometer in accordance with the present invention are shown in FIG. 1. These include a commercially available combined light source-detector unit 10 comprising a light source 12 and a detector 14. One such device comprises a Class 2 helium-neon laser, is sold by Renisliaw pic of Gloucestershire, United Kigdom under the commercial designation HS10 Laser Head. A splitter-holder assembly 16 comprises a beam splitter 18 and a reference holder 20 that are held in a fixed relationship to each other by a connector. To establish the fixed relationship, beam splitter 18 and reference holder 20 are mounted on a rod 22 by upper bracket 24 and lower bracket 26, respectively, that together comprise a connector for the beam splitter and reference holder. Preferably, rod 22 is made from a material having a low thermal coefficient of expansion, so that difference in temperature between one measurement and another will have little or no affect on the measurement. In a preferred embodiment, rod 22 comprises a carbon composite material, i.e., a material comprising a carbon matrix reinforced with carbon fibers, as is known in the art of thermally stable mate Preferably, lower bracket 26 is connected centrally to, and directly below, the reference holder 20 and the position of a workpiece 36 to be positioned on reference holder 20. In this way, the measuring optics are in with the measurement to be taken, and Abbe error is substantially eliminated.

A reference retroreflector 28 is disposed in fixed relationship to beam splitter 18 to receive a reference beam therefrom and to redirect the reference beam back towards the beam splitter, which in turn redirects the reference beam towards the detector 14. Preferably, reference retroreflector 28 is integal with beam splitter 18, i.e, it maybe mounted thereon to provide a retroreflector beam splitter unit 29, as shown in FIG. 1.

A test retroreflector 30 is positioned between beam splitter 18 and reference holder 20 and is movable relative to the splitter-holder assembly. As will be described further below, the test retroreflector 30 is movable so that it can be moved between a reference position and a measurement position that indicates the dimension of the workpiece to be measured relative to reference bolder 20. To facilitate such movement test retroreflector 30 may be mounted in an optical carriage member 32. The reference position is typically one in which the test retroreflector is resting on the carrying surface of reference holder 20 (or on the top surface of an optional gage block on the reference holder) on which the workpiece is placed for measurement. The measurement position is typically one in which the test retroreflector is in contact with a top surface of a workpiece resting on the reference holder. There may be an optional probe 34 carried with the test retroreflector 30 in carriage member 32 that can be used for making contact with a workpiece or the reference holder 20. Such a probe is preferably made from the same material as rod 22 so that any deviations in measurement due to temperature variations are minimized. In FIG. 1, a workpiece 36 is positioned on the upper, flat surface of reference holder 20. To measure the workpiece, probe 34 is moved from the reference position to the upper surface of workpiece 36 where the length of the workpiece is to be measured.

Figure 2:
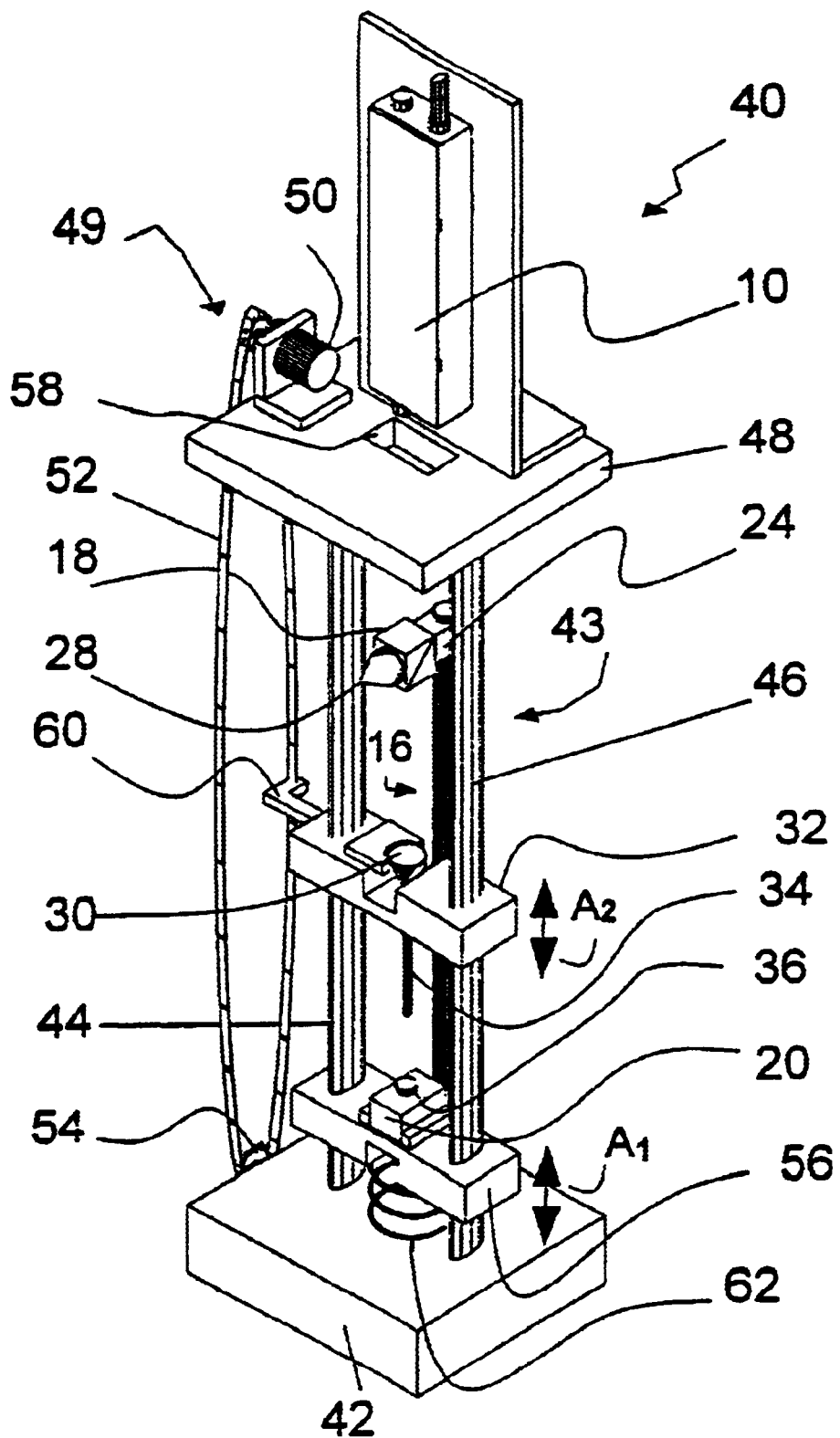
FIG. 2 is a prespective view of an apparatus according to a particular embodiment of the present invention.

As indicated above, the components of FIG. 1 can be mounted on a frame structure and in accordance with one aspect of the present invention, the splitter-holder assembly 16 is movably mounted on the frame structure and the test retroreflector 30 is movable relative to both the frame structure and to the splitter-holder assembly 16. A frame structure is employed to assure that the various components of the apparatus arc maintained in proper optical alignment so that measurements can be made. Preferably, a vibration-dampening member, such as a spring, suspends the splitter-holder assembly and the test retroreflector on the frame to minimize the effect that any environmental vibrations imposed on the frame structure in the measurement apparatus may have on the measurement. An apparatus in which the components are mounted on a frame structure in this way is shown in FIG. 2. Interferometer apparatus 40 comprises a frame structure 43 which, in the illustrated embodiment, comprises two upwardly-extending guide rails 44 and 46, an optional base 42 on which the guide rails 44 and 46 are mounted and an optional platform 48 mounted on the top of guide rails 44 and 46. The combined light source-detector unit 10 is mounted on the frame structure, on platform 48. An aperture 58 in platform 48 permits light beams to pass through to and from unit 10. Also mounted on the frame structure 43 is an optional motorized adjustment assembly 49 Comprising a motor 50, a positioning belt 52 and a tension pulley 54. In the illustrated embodiment, motor 50 is mounted on platform 48 and tension pulley 54 is mounted on base 42. Positioning belt 52 extends from motor 50 to tension pulley 54. The motorized adjustment assembly 49 is connected to the test retroreflector 30 (e.g., to carriage member 32) as described below so that the motorized adjustment assembly 49 can be used to position the test retroreflector 30 on the frame structure and move the test retroreflector between the reference position and the measurement position.

The splitter-holder assembly 16 is optionally, but preferably, movably mounted on the frame structure 43 by virtue of its attachment to a cross member 56 which is vertically slidable along guide rails 44 and 46 as indicated by arrow $A_1$. If the splitter-holder assembly is moved relative to the frame (e.g., if the reference holder is physically pushed downward, moving carriage member 32 downward) when the workpiece is on it and measurement probe 34 remains in contact with the workpiece, the distance between the retroreflector-beam splitter unit 29 and test beam retroreflector 30 remains constant. The fringe counts received after processing the phase relationship between the reference beam and the test beam will remain the same as when the splitter-holder assembly was in the upper position. In a similar manner, the affects of vibration on the measurement can be significantly reduced To dampen the transfer to splitter-holder assembly 16 of vibrations received from the environment (e.g., from a table top) though the frame structure 43 (e.g., via base 42), the splitter-holder assembly 16 is mounted on the frame structure 43 by a vibraton-dampening member such as a spring 62. Any vibrations received through base 42 are attenuated by the vibration-dampening member and have a minimal effect on the operation of the apparatus. It will be appreciated by one of ordinary skill in the art that a variety of vibration-dampening members can be used in place of spring 62. Carriage member 32, within which test retroreflector 30 is mounted, is configured to slidably engage guide rails 44 and 46 and to position test retroreflector 30 to receive and properly reflect the test beam from beam splitter 18. Carriage member 32 carries a belt clamp 60 that secures the carriage member to positioning belt 52 so that the vertical position of test retroreflector 30 relative to the frame structure 43 and to reference holder 20 can be controlled by the operation of the motorized adjustment assembly 49, as indicated by arrow $A_2$.

Figure 3:
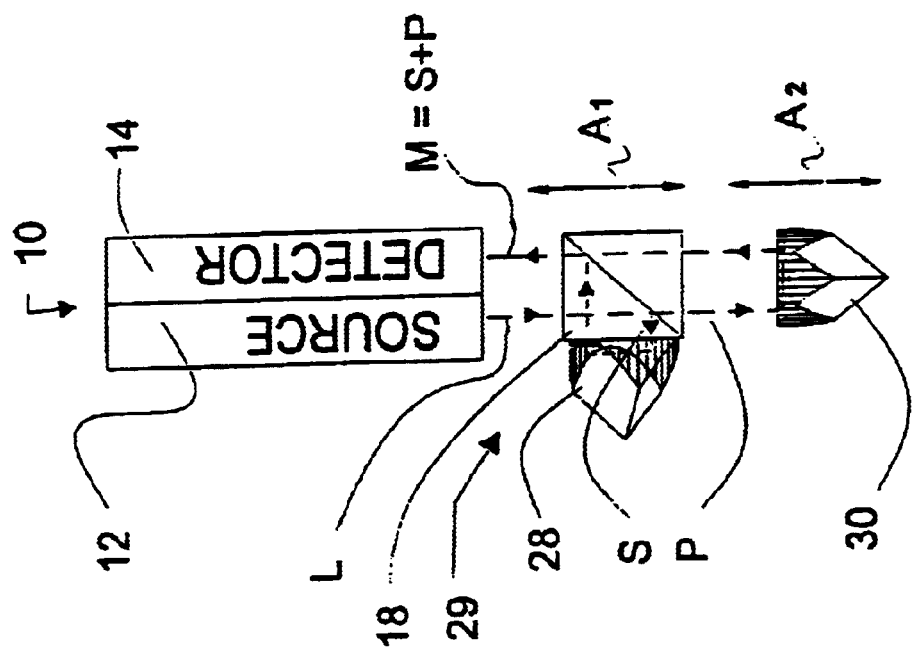
FIG. 3 is a schematic representation of the operation of an interferometer in accordance with the present invention.

The operation of apparatus 40 is described with reference to FIGS. 1 and 3. First, the apparatus is initialized by placing the test retroreflector 30 in a reference position, e.g., on the top surface of the reference holder 20. Source 12 emits a source beam L that is directed towards beam splitter 18. Source beam L is split into a reference beam S that is directed towards reference retroreflector 28 and a test beam P that is directed towards test retroreflector 30. Reference beam S is reflected by reference retroreflector 28 and test beam P is reflected by tm retroreflector 30. In the illustrated embodiment, reference retroreflector 28 and test retroreflector 30 direct their respective reference and test beams back to beam splitter 18, where the beams are combined into a measurement beam M (=S+P) that is directed into director 14, and the counting of fringes is then initialized. Test retroreflector 30 is then raised so that the test piece can be placed on the reference holder, and the test retroreflector is then placed in the test position, in which it rests on the top surface of the workpiece. The movement of test retroreflector 30 from the reference position to the test position creates fringes in the measurement beam directed into detector 14. The detector counts the fringes and from this datum determines the measured dimension of the workpiece in a manner well-known in the art.

Conversely, the measurement may be started by placing the test retroreflector in contact with the workpiece, initializing the detector, and then moving the workpiece and moving the test retroreflector to the reference position to cause fringes that are counted by the detector.

Alternatively, a measurement may be achieved by using a gage block to set the reference datun. The gage block can be placed on the top surface of the reference holder and the known thickness of the gage block is set in the processing electronics. The counting of fringes from this position is then initialized. Test retroreflector 30 is then raised so that the gage block can be removed, and the test piece can be placed on the reference holder. The test retroreflector is then placed in the test position, in which it rests on the top surface of the workpiece. The movement of the test retroreflector 30 from the reference position to the test position generates fringes that indicate the difference in thickness between the test piece and the gage block. From this datum the thickness of the workpiece can be determined by the processing circuitry associated with the detector.

Figure 4:
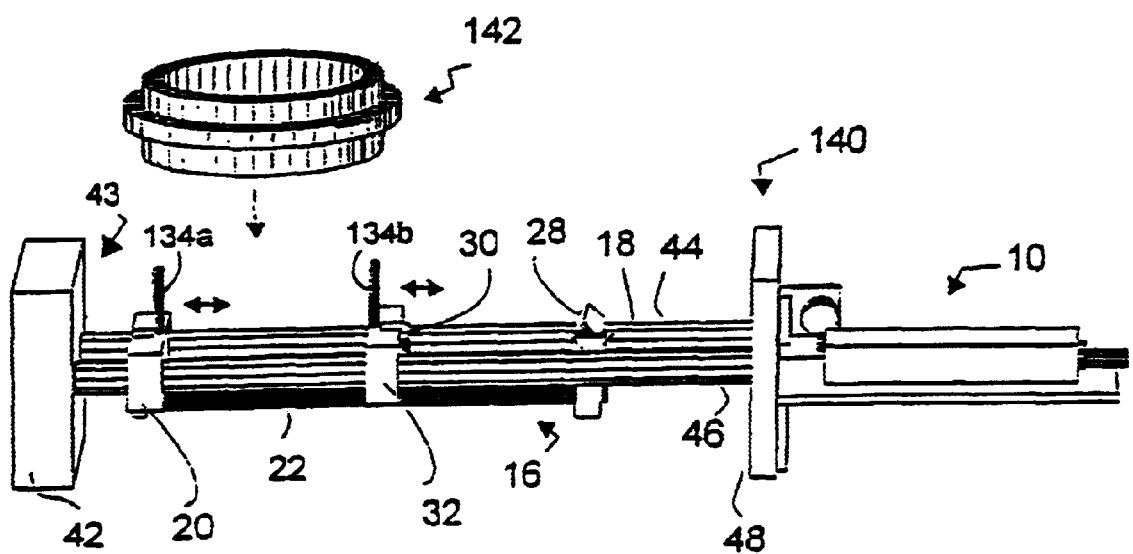
FIG. 4 is a perspective view of an alternative embodiment of an interferometer according to this invention.

According to yet another broad aspect of this invention, the reference holder and the carriage member for the test retroreflector may be adapted for the measurement of internal as well as external dimensions For example, as shown in FIG. 4, interferometer 140 is configured to measure the internal diameter of a ring-like workpiece 142. Interferometer 140 is optionally configured so that it may stand in a horizontal orientation on a table top, resting on base 42 and platform 48. The other structures of interferometer 140 are substantially the same as those of interferometer 40 (FIG. 2) and bear the same reference numerals. Accordingly, a detailed description of interferometer 140 is not necessary. Interferometer 140 differs from interferometer 40 (FIG. 2) in that reference holder 20 is equipped with a probe 134a; and carriage member 32 is equipped with a probe 134b; probes 134a and 134b extend upward at right angles from the direction of travel of carriage member 32 relative to splitter-holder assembly 16. Interferometer 140 is configured so that the reference position for the test retroreflector (not shown) may be attained by placing a gage ring (whose internal diameter is known) over probes 134a and 134b and moving carriage member 32 away from reference holder 20 to a reference position in which probes 134a and 134b contact diametrically opposite points inside the gage ring. The counting of fringes is then initialized. Then the gage ring can be removed and workpiece 142 can be over probes 134a and 134b. Carriage member 132 is moved until probe 134a and 134b are at diametrically opposite positions on the inner surface of workpiece 142, thus placing the test retroreflector in the measurement position. The movement of carriage member 32 from the reference position to the test position causes fringes at the detector in unit 10 from which the associated processing electronics determines the measurement of workpiece 142.

Conversely, the outer diameter of a workpiece can be measured by initializing the fringe count with probes 134a and 134b on the outer surface of a gage block. The workpiece to be measured is placed between probes 134a and 134b. The probes 134a and 134b are brought into contact with the outer surface of the workpiece and the measured length of the workpiece is determined from the fringe count and the known dimension of the gage block.

While the invention has been described in detail with reference to particular embodiments thereof, it will be understood by those of ordinary skill in the art that numerous variations and alterations to the described embodiments can be made and it is intended to include such alterations within the scope of the appended claims.

What is claimed is:

1. A measurement interferometer comprising a frame structure on which is mounted a laser source that emits a source beam, a detector, a beam splitter, a reference retroreflector, a test retroreflector and a reference holder;

characterized in at the beam splitter and the reference holder are interconnected in fixed mutual relation by a connector to constitute a splitter-holder assembly;

the beam splitter is positioned to receive a light beam from the laser source and emit a test beam and a reference beam split from the source beam;

wherein the reference retroreflector is positioned at a fixed distance from the beam splitter to receive the reference beam from the beam splitter; and wherein the test retroreflector is positioned to receive the test beam from the beam splitter and is movable on the frame structure relative to the splitter-holder assembly.

2. The interior of claim 1 wherein the connector in the splitter-holder assembly comprises a carbon composite rod.

3. The interferometer of claim 2 wherein the test retroreflector carries a probe comprising a carbon composite rod.

4. The interferometer of claim 1 wherein the reference retroreflector is integral with the beam splitter.

5. The interferometer of claim 1 comprising a vibration-dampening member between the splitter-holder assembly and the frame structure.

6. The interferometer of claim 1 comprising a spring between the splitter-holder assembly and the frame structure.

7. The interferometer of claim 1 wherein the test retroreflector is situated between the reference holder an the beam splitter.

8. The interferometer of claim 7 wherein the splitter-holder assembly is movably mounted an the frame structure.

* * * * *